US008371531B2

(12) United States Patent
Gallant et al.

(10) Patent No.: US 8,371,531 B2
(45) Date of Patent: Feb. 12, 2013

(54) AIRCRAFT CABIN WINDOW ASSEMBLY METHOD

(75) Inventors: Guillaume Gallant, Plaisance du Touch (FR); Damien Aguera, Toulouse (FR); Philippe Bernadet, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 777 days.

(21) Appl. No.: 12/521,819

(22) PCT Filed: Jan. 3, 2008

(86) PCT No.: PCT/FR2008/050008
§ 371 (c)(1),
(2), (4) Date: Oct. 28, 2009

(87) PCT Pub. No.: WO2008/096088
PCT Pub. Date: Aug. 14, 2008

(65) Prior Publication Data
US 2010/0044513 A1  Feb. 25, 2010

(30) Foreign Application Priority Data
Jan. 5, 2007  (FR) ..................................... 07 52534

(51) Int. Cl.
*B64C 1/14*  (2006.01)

(52) U.S. Cl. .................................................. 244/129.3
(58) Field of Classification Search ............... 244/129.3, 244/121; 296/146.1, 77.1
See application file for complete search history.

(56) References Cited

U.S. PATENT DOCUMENTS 4,960,631 A * 10/1990 Walters et al. ................ 428/192
2006/0123718 A1 * 6/2006 Paspirgilis ................... 52/204.1

* cited by examiner

*Primary Examiner* — Benjamin P Lee
*Assistant Examiner* — Benjamin Gomberg
(74) *Attorney, Agent, or Firm* — Perman & Green, LLP

(57) ABSTRACT

A method for assembling a cabin window to a bay in a side wall of an aircraft fuselage, where the cabin window including an outer transparent element and at least one inner transparent element, includes making a non-through hole in a portion of the side wall. The outer transparent element includes a first part having a diameter greater than that of the bay and which is shaped to co-operate with the portion of the side wall to block the outer transparent element in the bay both laterally and longitudinally. A second part of the outer transparent element has a groove that projects into the fuselage. The outer transparent element and the at least one inner transparent element are welded to the fuselage using a strap which presses a seal against at least the fuselage and the inner wall of the groove.

10 Claims, 1 Drawing Sheet

AIRCRAFT CABIN WINDOW ASSEMBLY METHOD

CROSS-REFERENCE TO RELATED APPLICATIONS

This application claims priority to International Application PCT/FR2008/050008 filed 3 Jan. 2008, which claims priority to French Application No. 07 52534 filed on 5 Jan. 2007, the disclosure of which are incorporated by reference herein their entireties.

BACKGROUND

1. Field

The disclosed embodiments relates to a method for assembling a window along an opening provided in a side wall of the fuselage of an aircraft.

2. Brief Description of the Related Developments

The disclosed embodiments relate to a method for assembling a window along an opening provided in a side wall of the fuselage of an aircraft.

In commercial aircrafts for example, openings are provided in the side walls of the fuselage to receive windows and enable the passengers to see directly the environment outside the fuselage.

However, these windows generate many drawbacks. First, a window on an aircraft must provide a sound and a heat insulation of the internal space of the fuselage from the outside so as to provide comfort to the passengers. In addition, it must be water and airtight.

The frame of the window which is typically riveted onto the skin of the fuselage must also resist the mechanical constraints such as the loads resulting from the flexion of the fuselage and the pressurization which is applied onto the window.

The window must then comply with the aero-dynamical profile of the aircraft.

All these constraints led manufacturers to provide a specific stiffening of the window area.

FIG. 1 schematically shows a partial sectional view of a prior art window mounted on a side wall 1 of an aircraft fuselage.

The aircraft window includes an external pane 2 and an internal pane 3 forming a second safety barrier, and it is itself potentially protected against accidental scratches by a third pane.

The external pane 2 and the internal pane 3 are separated from each other by a joint 4 which provides a sealing function.

The frame of the window 5 is made integral with the side wall 1 of the fuselage using two rows of rivets (not shown) extending on the whole periphery of the opening 6 on the side wall 1 of the fuselage.

The panes 2, 3 and the joint 4 are held in position by mechanical fasteners such as fastening clips 7 and nuts and studs.

Assembling these mechanical fasteners is difficult and a time-consuming job. This assembling is thus expensive as regards the detention of the plane in case of maintenance.

These mechanical fasteners also mean an additional weight which has a negative effect on the consumption of kerosene by the aircraft.

In addition, some of these mechanical fasteners require the provision of additional holes in the side wall of the fuselage. Now the provisional holes in the skin of composite fuselage mean many constraints as regards the mechanical behavior.

It can be noted that some brackets are fragile and are submitted to an increased maintenance, which increases the aircraft servicing costs.

Then an urging need exists for an aircraft window of a simple design and operation which can be positioned without any additional drilling of the skin on the fuselage and an easy and optimum maintenance thereof.

SUMMARY

The aim of the disclosed embodiments is thus to provide an economical external transparent element having a very important mechanical resistance while having a minimum mass and requiring no drilling of the side wall of the fuselage of the aircraft other than the window opening nor any mechanical fasteners to connect the wall of the fuselage to the doublers.

Another aim of the disclosed embodiments is a method for mounting an aircraft window including such an external transparent element on an opening provided in the side wall of an aircraft. This method of assembling is particularly simple as regards its operation and allows their quicker removal and mounting of the window and consequently reduces maintenance costs.

This mounting is also sure since only one hole is provided in this side wall per window. Advantageously this mounting does not put into question the compatibility of displacement between the window and the fuselage wall.

Then, such a mounting makes it possible to protect the free edge of the fuselage wall, at the place where it is the finest, using the external transparent element. This mounting is nevertheless only compatible with an opening edge which includes no flanged edge.

For this purpose, the disclosed embodiments relate to a method for assembling a window on an opening provided in a side wall of the fuselage of an aircraft, this window including an external transparent element and at least one internal transparent element.

According to the disclosed embodiments, this method includes the following steps:

a blind recess is provided on a portion of this side wall along the perimeter of said opening, the external transparent element is positioned from the outside of the fuselage in the opening, with this external transparent element having a first part, the diameter of which is greater than the diameter of the opening, with this first part having a shape cooperating with said portion of the side wall so as to laterally and longitudinally block the external transparent element in this opening, the external transparent element including a second part having a groove protruding inside the fuselage, the external transparent element and said at least one internal transparent element is made integral with the fuselage through a band strip, this band strip pressing a joint against at least the fuselage and the internal wall of the groove.

Advantageously, these transparent elements are made of a material complying with the mechanical resistance and resistance to corrosion criteria connected to applications in the field of aeronautics. Purely as an illustration, the transparent elements are made of drawn acrylic.

In various particular embodiments of this assembling method, each of which has its particular advantages and being liable of many possible technical combinations:

said blind recess includes a chamfer.

This chamfer advantageously makes it possible to provide a substantially water and airtight connection between the external transparent element and the side wall of the fuselage.

Alternatively, this chamfer may additionally include a semi-cylindrically shape recess intended for receiving a matching protrusion such as a seam.

This chamfer also makes it possible to make sure that the external transparent element does not exceed the aero-dynamical profile defined by the side wall of the fuselage.

said at least one internal transparent element is assembled to the external transparent element with the joint prior to step c), the band strip including at least two band strip elements, these band strip elements are made integral together through at least one fastening member.

These fastening members are preferably mechanical members and include screws, bolts, and circlips for example. The internal transparent element has a shape selected from the group including an elliptical shape, a triangular shape, a rectangular shape and a diamond shape.

Of course, the opening in the side wall of the fuselage includes a shape which is substantially identical to that of the internal transparent element so as to give a view on the environment outside the fuselage which is the best for the passenger. This internal transparent element is substantially opposite the opening.

These fastening members are preferably mechanical members and include screws, bolts, and circlips for example. The internal transparent element has a shape selected from the group including an elliptical shape, a triangular shape, a rectangular shape and a diamond shape.

According to the disclosed embodiments, this external transparent element is made of one block. It includes at least a first part the diameter of which is greater than the diameter of the opening, with this first part having a shape intended to cooperate with a blind recess provided on said external side wall of the fuselage along the perimeter of said opening so as to laterally and longitudinally block this external transparent element in the opening. This element further includes a second part having a groove, this groove being separated from the external surface of the first part by a distance d so as to be positioned inside the fuselage when the external transparent element is pressed against said opening.

Preferably, this recess has a chamfer, the first part of the external transparent element includes an obliquely cut edge so that it can cooperate with this chamfer.

In various particular embodiments of this external transparent element, each having its particular advantages and liable to many possible technical combinations:

the groove is separated from the external surface of the first part by a distance d so that one of the side edges thereof overlaps the sidewall of the fuselage when the external transparent element is integral with said opening, the transparent element further includes a third part forming an internal transparent element intended to be positioned substantially opposite the opening.

Finally, the disclosed embodiments relate to an aircraft having a fuselage the side walls of which include windows.

According to the disclosed embodiments, at least some of these windows include an external transparent element such as previously described.

The disclosed embodiments will be described in greater details and referring to the appended drawings, wherein:

DETAILED DESCRIPTION

Figure 3:
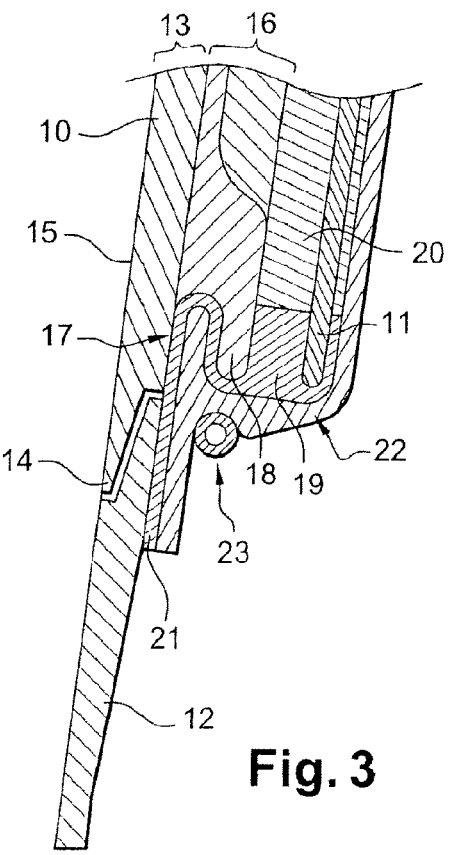
FIG. 3 schematically shows a partial sectional view of the axis A-A of the window of FIG. 2.

FIG. 3 shows a partial sectional view of a window mounted on an opening provided in a side wall of the fuselage of an aircraft according to a particularly embodiment of the disclosed embodiments.

This window includes an external transparent element 10 and an internal transparent element 11. The external transparent element 10 is mounted on an opening provided in the side wall 12 of the fuselage of an aircraft. This fuselage can be metallic or made of composite materials such as carbon fibers for example.

The external transparent element 10 is made of one block. It includes a first part 13 the diameter of which is greater than the diameter of said opening. This first part 13 includes an edge 14 which is partially obliquely cut. This edge 14 thus has two substantially plane surfaces connected together through an inclined portion so that this first part has a reduced diameter with respect to the outermost surface 15. The outermost surface 15 has a shape providing an aero-dynamical continuity with the side wall of the aircraft fuselage.

This first part 13 is intended to cooperate with a blind recess provided in the side wall 12 as well the fuselage along the perimeter of said opening. This recess which includes a chamfer has a shape which is substantially similar to that of the edge 14 of the first part so as to laterally and longitudinally block the external transparent element 10 in this opening.

The external transparent element 10 includes a second part 16 having a groove 17. This groove 17 is separated from the external surface 15 of the first part 13 by a distance d so as to be positioned inside the fuselage when the external transparent element 10 is made integral with the opening.

The edge of the external transparent element 10 is positioned inside the fuselage and surrounding this groove 17, makes a lip 18. A flexible joint 19 makes it possible to assemble the external transparent element 10 and the internal transparent element 11 while keeping them separated from each other by an intermediate space 20. This joint rests on the lip 18 of the external transparent element 10.

The sealing of the window/side wall of the fuselage mounting is obtained by pressing a lip 21 of this joint 19 against the fuselage and the internal wall of the groove 17. This joint 19 is a continuous joint. The joint may for example be made of an elastomer which is a rubber derivative.

The window includes a band strip 22 making it possible to lock the transparent assembly on the wall of the fuselage, with this transparent assembly including the internal and external transport elements 10, 11 and the joint 19.

This band strip 22 includes a protrusion capable of cooperating with the groove 17 for pressing the lip of the joint 19 against the internal wall thereof. This band strip 22 including at least two band strip elements is held in position by a joint 23 which rests in a groove provided on the external face of the band strip 22.

The opening and the internal transparent element 11 may have an elliptic shape and dimension of the order of 350×250 mm thus offering a larger vision for the passenger than the known windows of the prior art. The first part of the external transparent element 10 then has dimensions greater than 350× 250 mm so as to overlap the recess provided in the side wall of the fuselage along the perimeter of the opening.

Alternatively, their shape may be chosen from the group including a triangular form, a rectangular form, a diamond form.

The disclosed embodiments also relate to a method for assembling this window including an external transparent element 10 and at least one internal transparent element 11.

Alternatively, their shape may be chosen from the group including a triangular form, a rectangular form, and a diamond form.

Then, the external transparent element 10 is positioned from the outside of the fuselage in the opening so that the first part 13 of this external transparent element cooperates with the blind recess so as to laterally and longitudinally block the external transparent element in the opening.

The external transparent element 10 then has a second part 16 having a groove 17 protruding inside the fuselage. Preferably, this groove 17 has one of the edges thereof aligned with the side wall of the fuselage.

Then, a joint 19 is positioned to assemble an internal transparent element 11 with this external transparent element 12. A lip 21 of this joint is pressed against the side wall 12 of the fuselage, the bottom of the groove 17 using a band strip 22 to provide a sealed mounting. This band strip 22 makes it possible to lock the six degrees of freedom thus obtained for the window.

Figure 1:
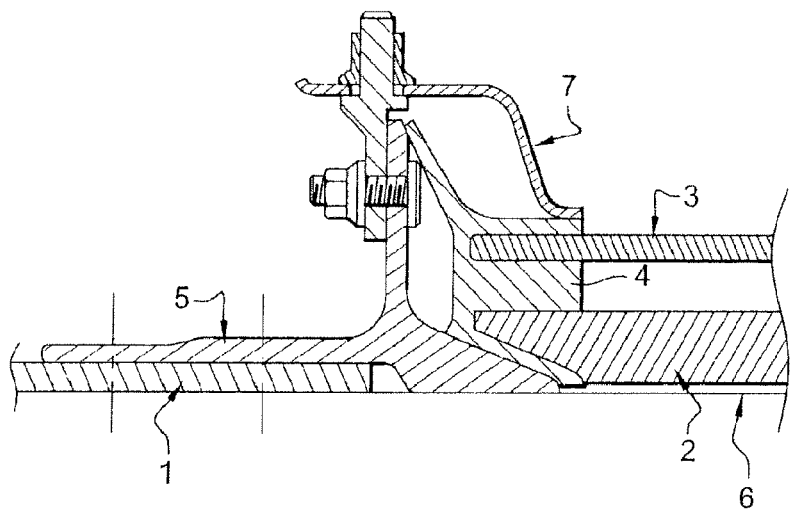
FIG. 1 schematically shows a partial sectional view of the window of an aircraft of the prior art.
Figure 2:
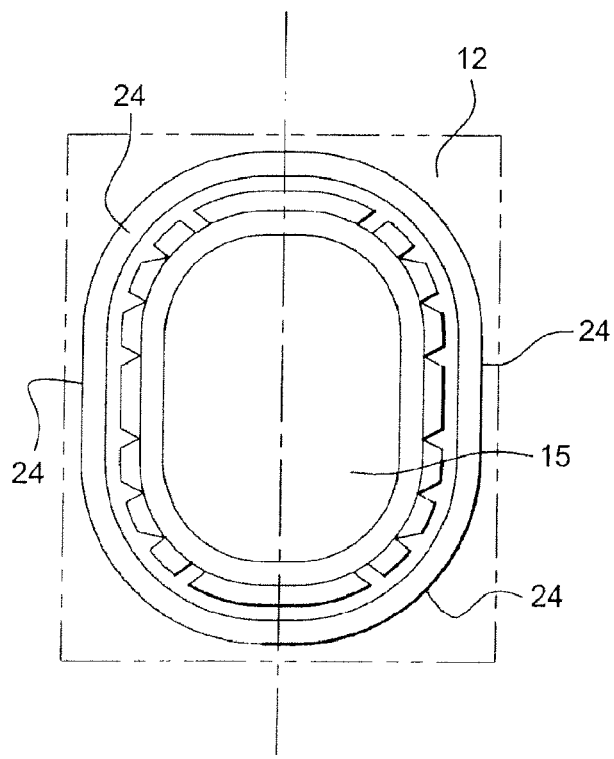
FIG. 2 is a schematical representation of a window of an aircraft according to the disclosed embodiments.

To position this band strip 22 which includes preferably two band strips elements, each band strip element is laterally engaged on the transparent assembly including the joint 19, the external transparent element 10 and the internal transparent element 11. This positioning of the band strips is symbolized by arrows 24 on FIG. 2.

Advantageously, the external transparent element 11 has a substantially elliptical shape and dimensions greater than 350×250 mm.

What is claimed is:

1. A method for assembling a window on an opening provided in a side wall of the fuselage of an aircraft, said window including an external transparent member and at least one internal transparent member, the method comprising:
   a) providing a blind recess on a portion of said side wall along a perimeter of said opening,
   b) positioning said external transparent member from outside of the fuselage in said opening, said external transparent member having a first part a diameter of which is greater than a diameter of said opening, with said first part having a shape cooperating with the portion of said side wall so as to laterally and longitudinally lock said external transparent member in said opening,
   c) said external transparent member including a second part having a groove protruding inside said fuselage, wherein the external transparent member is made integral with said at least one internal transparent member and with said fuselage through a band strip, said band strip applying a joint against at least the fuselage and an internal wall of said groove.

2. A method according to claim 1, wherein at the least one internal transparent member is assembled to said external transparent element with said joint prior to step c).

3. A method according to claim 1, wherein said blind recess comprises a chamfer.

4. A method according to claim 1, wherein the band strip comprises at least two band strip elements.

5. A method according to claim 4, wherein each band strip element is laterally engaged on the assembled window, the assembled window comprising said joint, said external transparent element and said at least one internal transparent element.

6. A method according to claim 1, wherein said joint is a continuous joint.

7. A method according to claim 1, wherein said external transparent element has a substantially elliptical shape and dimensions above 350×250 mm.

8. An external transparent element configured to be mounted on an opening defined in a side wall of a fuselage of an aircraft, wherein the external transparent element is made in one piece and includes at least:
   a first part a diameter of which is greater than a diameter of said opening, with said first part having a shape intended to cooperate with a blind recess provided on said side wall of the fuselage, along a perimeter of said opening so as to block laterally and longitudinally said external transparent element in said opening,
   a second part having a groove, said groove being spaced from an external surface of the first part by a distance d, so as to be positioned in said fuselage when the external transparent element is pressed against said opening.

9. An element according to claim 8, wherein said groove is spaced from the external surface of the first part by the distance d, so that a side edge of said groove overlaps the side wall of the fuselage when the external transparent element is integral with said opening.

10. An aircraft having a fuselage at least the side walls of which include windows, wherein at least certain windows would include an external transparent member according to claim 8.

* * * * *